United States Patent
Hirose

[11] 3,994,571
[45] Nov. 30, 1976

[54] ZOOM LENS SYSTEM HAVING A FOCUSING LENS CONSISTING OF ONLY ONE LENS COMPONENT

[75] Inventor: Ryusho Hirose, Machida, Japan

[73] Assignee: Canon Kabushiki Kaisha, Japan

[22] Filed: Dec. 4, 1974

[21] Appl. No.: 529,529

[30] Foreign Application Priority Data
Dec. 7, 1973  Japan............................ 48-139217

[52] U.S. Cl.................................. 350/184; 350/186
[51] Int. Cl.²......................................... G02B 15/16
[58] Field of Search............................. 350/184, 186

[56] References Cited
UNITED STATES PATENTS

| | | | |
|---|---|---|---|
| 2,844,996 | 7/1958 | Klemt | 350/184 |
| 2,847,907 | 8/1958 | Angenieux | 350/184 |
| 3,697,155 | 10/1972 | Ruben | 350/184 |
| 3,784,284 | 1/1974 | Nakamura | 350/186 |

Primary Examiner—John K. Corbin
Assistant Examiner—Conrad Clark
Attorney, Agent, or Firm—McGlew and Tuttle

[57] ABSTRACT

The zoom objective is of the type in which the provision for focusing is made at the front component consisting of only one element comprising a simple plano-convex component of forward convexity movable for focusing, and comprises further a variator of negative power consisting of a doublet component having a positive meniscus element in front of a double-concave element, a compensator of positive power consisting of a doublet component having a negative element in front of a double-convex element followed by a positive simple meniscus component of forward convexity, and a relay system. Because of the incapability of concentrating aberration correction especially with respect to chromatic aberrations in the front component for focusing, the present invention gives rise to the possibility of achieving a high standard of correction of various aberrations by use of the variator and particularly the compensator throughout the zooming range.

2 Claims, 10 Drawing Figures

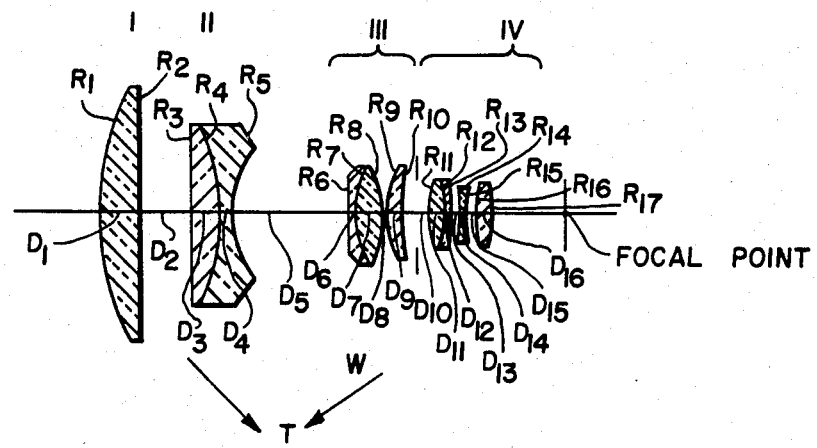
FIG. I
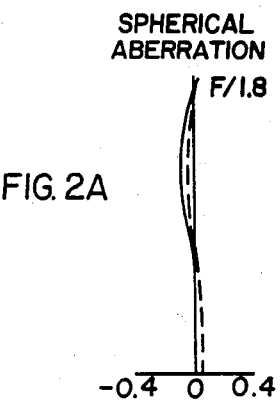
FIG. 2A
SPHERICAL ABERRATION
F/1.8
-0.4  0  0.4
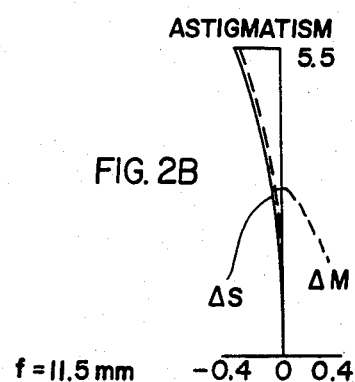
FIG. 2B
ASTIGMATISM
5.5
ΔS   ΔM
f = 11.5 mm   -0.4  0  0.4
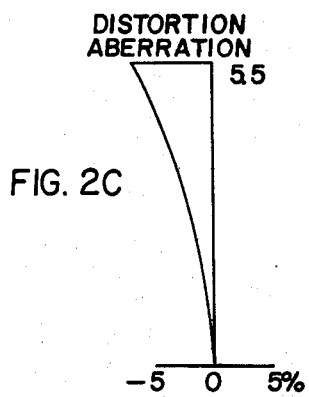
FIG. 2C
DISTORTION ABERRATION
5.5
-5  0  5%
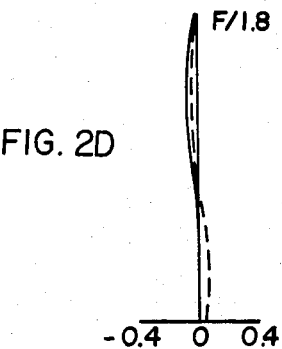
FIG. 2D
F/1.8
-0.4  0  0.4
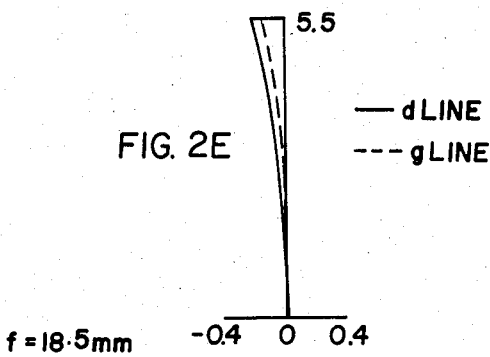
FIG. 2E
5.5
——— d LINE
--- g LINE
f = 18.5 mm   -0.4  0  0.4
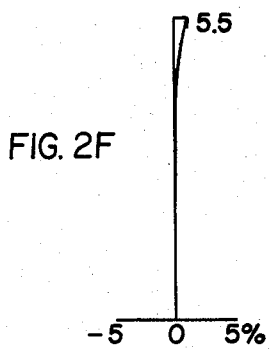
FIG. 2F
5.5
-5  0  5%
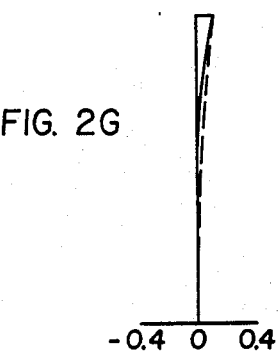
FIG. 2G
-0.4  0  0.4
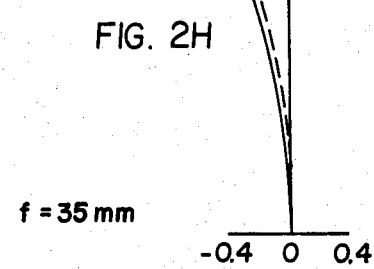
FIG. 2H
f = 35 mm   -0.4  0  0.4
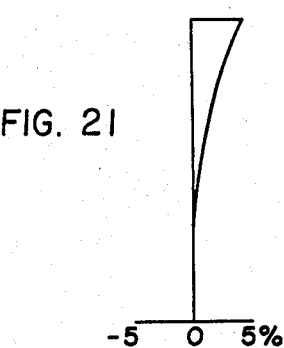
FIG. 2I
-5  0  5%

ZOOM LENS SYSTEM HAVING A FOCUSING LENS CONSISTING OF ONLY ONE LENS COMPONENT

BACKGROUND OF THE INVENTION

This invention relates to a zoom objective for use in a 8 mm cinematograph camera or television camera, and which has a high relative aperture, covers a generally accepted range of variation of equivalent focal length, and is particularly of low cost. More particularly, it relates to a zoom objective having a relative aperture ratio of $f/1.8$ and a zoom ratio of 3 and covering a field angle of as large as 52° while nevertheless the focusing provision is made at only one lens element.

Of various types of zoom objectives such as those adapted for use in projectors, there is known a type of zoom objective of which the front focusing member consists of only one lens element. Usually such an objective is designed to have a zoom ratio which is in the order of 1.5 to 2 and a field angle of not more than 40°. Accordingly, the features of the zoom objective abovespecified assist in facilitating the solution of aberrational problems. On the other hand, it has generally been recognized in the art that increasing of the zoom ratio and the field angle to 3° and 50°, respectively, as in the zoom objective according to the invention, makes it more difficult to achieve a good state of correction of the chromatic image aberrations throughout the zooming range, unless each of the movable lens members in the zoom objective satisfies the achromatic condition.

Attempts have been made to reduce the production cost of zoom objectives by decreasing the number of lens elements in a single objective. A typical zoom objective of such low cost design comprises a first member arranged to serve as a focusing member and as a compensator, a second member which is a variator, and a relay system. In order for the movable lens members to satisfy the achromatic condition, a compound component is employed in the first member. In this arrangement, however, it is necessary to impart increased curvature to some of the surfaces of the lens elements of the objective and particularly to the cemented contact surfaces in the compound components, whereby it is made impossible to grind a great number of lens elements, having such large radii of curvature, at one time. Therefore, the decrease in the number of lens elements which can be produced in a single production run results in an increase in the production cost which cancels the decrease in the production cost of completed objectives effected by the decrease in the number of lens elements in the single zoom objective.

SUMMARY OF THE INVENTION

The present invention has for its object to provide a zoom objective having the focusing provision made at only one lens element while, nevertheless, the chromatic aberrations, as well as the spherical aberration, astigmatism and distortion, are sufficiently well corrected for high grade imaging performance throughout the entire zooming range, and which is of low cost. It should be mentioned that the term "only one lens element" as herein used is intended to mean the number of lens elements which contribute aberration to the complete system but is not concerned with whether or not optical means such as filters are included therein.

BRIEF DESCRIPTION OF THE DRAWINGS

FIG. 1 is a block diagram of a zoom objective according to a preferred form of the present invention.

FIGS. 2A through 2I are graphic representations of correction of various aberrations of the objective of FIG. 1 occurring when the equivalent focal length is the minimum, medium and maximum value in the range of variation.

DESCRIPTION OF THE PREFERRED EMBODIMENT

For stabilization, with zooming, of the chromatic image aberrations, it has been the prior art lens design to achromatize each of the movable lens members of the objective as mentioned above. This invention, which concerns a type of zoom objective in which the positions occupied by the compensator at the wide angle and telephoto settings in the range of variation are different in distance from the focal plane as indicated by arrows in FIG. 1, gives rise to the possibility of constructing the front member for focusing from only one lens element which is not achromatic by specifying the following relationships for the variator and compensator.

The achromatic conditions defined for the compensator of positive power including at least one concave lens element are:

$$\Sigma \frac{\psi_i}{\nu_i} = \frac{\psi}{\nu} \quad (A)$$

$$\psi = \Sigma \psi_i$$

$$\psi_i = (N_i - N_{i-1})(1/r_i - 1/r_{i+1})$$

wherein it is assumed that the axial distance between the adjoining surfaces in the compound component is zero and the cemented contact is exposed to air; $\nu_i$ is the dispersive power of the ith lens element counting from the front in the compensator; $r_i$ is the radius of curvature of the ith surface; and $N_i$ is the index of refraction of the material from which the ith lens element is made.

The equivalent $\nu$ value for the compensator calculated based on formula A has to satisfy the following formula $$\nu \geq -295.5 \quad (1)$$

The equivalent $\nu'$ value for only the variator has to satisfy the following formula $$\nu' \geq 69 \quad (2)$$

The conditions (1) and (2) facilitate the achievement of good stability of correction of the chromatic image aberrations throughout the zooming range. In other words, so far as the zoom objective having a compensator which occupies positions different from each other at the wide angle and telephoto settings is concerned, satisfaction of the achromatic condition (1) for the compensator provides for good correction of the chromatic image aberrations especially with respect of the lateral chromatic aberration during the zooming. On the other hand, variation with zooming of the longitudinal chromatic aberration which is intensified by this prerequisite can be compensated for by employment of a variator designed so as to satisfy the condition (2).

When both of the conditions (1) and (2) are violated, there is no possibility of constructing a zoom objective of the type having the focusing provision made at only one lens element while still stabilizing the chromatic aberrations for a good standard of correction throughout the zooming range.

For stabilization of correction of various aberrations other than the chromatic aberrations during the zooming, it has been the prior art practice in the zoom lens design to split the front focusing member into at least two parts. This prior art technique is based on the fact that the residual aberrations at the telephoto setting are considerably large as compared with those at the wide angle setting. This technique cannot be applied to the present invention, because the front member of the invention is constructed as consisting of only one lens element. However, it has now been found that assistance in achieving a high standard of stabilization of correction of various aberrations throughout the zooming range can be obtained, for a zoom objective of the type described, if the following features within the framework provided by conditions (1) and (2) are embodied in the focusing element, variator and compensator of the zoom objective.

The condition (3) for the focusing lens element which is of positive meniscus (or plane-convex) and for the variator is:

$$\left.\begin{array}{l} 0 < r_1 < r_2; \text{ and} \\ 0.6f_2 < r_5 < |r_3| \end{array}\right\} \quad (3)$$

wherein $r_1$ and $r_2$ are the radii of curvature of the front and rear surfaces of the focusing element I respectively; $f_2$ is the focal length of the variator II; and $r_3$ and $r_5$ are the radii of curvature of the front and rear surfaces of the variator respectively.

The condition (4) for the compensator constructed as consisting of at least two components, at least one of which is a positive meniscus doublet component, is:

$$\left.\begin{array}{l} 0.5f_3 \leq r_9 \leq 1.1f_3 \\ f_3 \leq r_{10} \\ r_9 \leq r_{10} \\ 5f_3 \leq r_6, \text{ or } r_6 \leq 0 \ (\frac{1}{r} \leq \frac{1}{5f_3}) \\ |r_8| \leq |r_6| \end{array}\right\} \quad (4)$$

wherein $f_3$ is the focal length of the compensator III; $r_6$ and $r_8$ are the radii of curvature of the front and rear surfaces of the front component IIIa of the compensator III; and $r_9$ and $r_{10}$ are the radii of curvature of the front and rear surfaces of the rear component IIIb.

The first formula of condition (3) indicates that the focusing lens element is a positive meniscus lens element convex to the front. When the first formula of condition (3) is not satisfied, the astigmatism at the telephoto setting is overcorrected as compared with that at the wide angle setting. If the surfaces of the focusing element are otherwise configured so as to contribute towards the undercorrection control of astigmatism at the telephoto setting, no assistance in the stabilization of astigmatism correction during the zooming can be obtained even when the variator and compensator are employed for compensation of the residual astigmatism variation introduced by the thus configured focusing lens element. When the second formula of condition (3) is not satisfied in a zoom objective having a focusing lens element satisfying the first formula, the distortion at the wide angle setting becomes of the barrel type, and the outward coma at the telephoto setting becomes objectionable.

In the zoom objective satisfying the condition (3), the residual spherical aberration variation is such that a remarkable overcorrection is effected at the telephoto setting as compared with that at the wide angle setting. In order to compensate such residual spherical aberration variation, there is set forth the condition (4). When the first, second and third formulae of condition (4) are not satisfied, the overcorrection of the spherical aberration at the telephoto setting cannot be compensated for in any way. The features of the front component of the compensator provided by the fourth and fifth formulae of condition (4) contribute in cooperation with one another towards production of different sign comas. If the forth and fifth formulae of condition (4) are not satisfied, the inward coma at the wide angle setting is intensified by an increase of halo due to the outward coma at the telephone setting, resulting in production of a zoom objective which is rich in halo.

According to the present invention, as far as the basic structure of a zoom lens described is concerned, the front member movable for focusing consists of only one positive meniscus lens element (which may be a plano-convex lens element) convex to the front, and the compensator performs, during the range of variation of equivalent focal length, a total axial movement in a single direction. Further a zoom objective of the type must be so designed as to have a high relative aperture $f/1.8$ and a zoom ratio of 3 and to be capable of subtending a total angular field coverage of as wide as 52°. With such limitations, the present invention has made it possible to provide a zoom objective of low cost, while still enabling the residual chromatic aberration to be maintained stable under conditions (1) and (2), and a high standard of correction of other various aberrations to be maintained stable under conditions (3) and (4) throughout the zooming range.

According to a preferred embodiment of the present invention as shown in FIG. 1, the zoom objective can be constructed in accordance with the numerical data given in the following table for the radii R, the lens thicknesses or axial separations D, the indices of refraction N for the spectral $d$ line of sodium and the dispersive indices $\nu$ for the various lens elements. The zoom objective thus constructed will have a relative aperture of $f/1.8$ and a focal length range adjustable between a minimum focal length of 11.5mm to a maximum focal length of 35mm. The various aberrations of the objective are shown in FIGS. 2A through 2I.

| surface | R | D | N | $\nu$ |
|---|---|---|---|---|
| 1 | 39.2 | 7.5 | 1.51633 | 64.1 |
| 2 | ∞ | $l_1$ | | |
| 3 | −440.7 | 5.2 | 1.71736 | 29.5 |
| 4 | −29.76 | 1.45 | 1.69350 | 53.3 |
| 5 | 17.0 | $l_2$ | | |
| 6 | 944.5 | 1.0 | 1.80518 | 25.4 |
| 7 | 18.1 | 4.25 | 1.60311 | 60.7 |
| 8 | −45.41 | 0.2 | | |
| 9 | 16.9 | 3.85 | 1.69350 | 53.3 |
| 10 | 67.97 | $l_3$ | | |
| 11 | 16.4 | 4. | 1.69895 | 30.1 |
| 12 | −12.9 | 1. | 1.713 | 54.0 |
| 13 | −28.5 | 1.0 | | |
| 14 | −13.33 | 1.15 | 1.80518 | 25.4 |
| 15 | 10.15 | 1.8 | | |
| 16 | 19.13 | 3.5 | 1.71300 | 54.0 |

-continued

| surface | R | D | N | ν |
|---|---|---|---|---|
| 17 | −12.1 | | | |

What is claimed is:

1. A zoom objective, of the type having the focusing provision made only at one lens element, comprising a front member of positive power movable for focusing, a variator of negative power, a compensator of positive power coupled to and movable with said variator to effect zooming, and a stationary relay system; said front member consisting of a positive lens element with the radius of curvature of the front surface being less than that of its rear surface, and the front surface being forwardly convex; said variator including a doublet component composed of a positive lens element and a biconcave lens element cemented together at their adjacent surfaces, the rearmost surface of said variator having the least radius of curvature of the lens element surfaces of said variator; said compensator consisting of a doublet component, comprising a negative lens element and a positive lens element cemented together at their adjoining surfaces, and a positive meniscus simple component having a front surface which is convex; said compensator performing, during the zooming range, a total axial movement such that the axial separation between said variator and compensator is a minimum when said objective is at the telephoto setting and the maximum when said objective is at the wide angle setting; the respective positions occupied by said compensator at the telephoto setting and the wide angle setting being different in distance from the focal plane of said objective.

2. A zoom objective, of the type having the focusing provision made at only one lens element, comprising a front member of positive power movable for focusing, a variator of negative power, a compensator of positive power coupled to and movable with the variator to effect zooming, and a stationary relay system; said front member consisting of a positive lens element of forward convexity; said variator being a single component consisting of at least two lens elements, with the rearmost surface of the variator having the least radius of curvature of the lens element surfaces of the variator and being concave to the front; said compensator consisting of at least two components one of which is a doublet component, having a negative lens element and a positive lens element cemented together at their adjoining surfaces, and another of which is a positive meniscus simple component convex to the front, and said compensator performing, during the zooming range, a total axial movement such that the axial separation between said variator and said compensator is a minimum when said objective is at the telephoto setting and a maximum when said objective is at the wide angle setting, and the respective positions occupied by said compensator at the telephoto setting and at the wide angle setting are different in distance from the focal plane of the objective; said variator including a doublet component having a positive lens element and a double-concave lens element cemented together at their adjoining surfaces; the characteristics of the various elements of the objective and their separational relationships to each other being substantially of the proportions indicated by the numerical data in the following table, where R is the radius of curvature of each element surface; D is the axial thickness of each element or the axial separation between successive components; N is the index of refraction of each element for the spectral $d$ line of sodium; and $\gamma$ is the dispersive index of each element:

| surface | R | D | N | ν |
|---|---|---|---|---|
| 1 | 39.2 | 7.5 | 1.51633 | 64.1 |
| 2 | ∞ | $l_1$ | | |
| 3 | −440.7 | 5.2 | 1.71736 | 29.5 |
| 4 | −29.76 | 1.45 | 1.69350 | 53.3 |
| 5 | 17.0 | $l_2$ | | |
| 6 | 944.5 | 1.0 | 1.80518 | 25.4 |
| 7 | 18.1 | 4.25 | 1.60311 | 60.7 |
| 8 | −45.41 | 0.2 | | |
| 9 | 16.9 | 3.85 | 1.69350 | 53.3 |
| 10 | 67.97 | $l_3$ | | |
| 11 | 16.4 | 4. | 1.69895 | 30.1 |
| 12 | −12.9 | 1. | 1.713 | 54.0 |
| 13 | −28.5 | 1.0 | | |
| 14 | −13.33 | 1.15 | 1.80518 | 25.4 |
| 15 | 10.15 | 1.8 | | |
| 16 | 19.13 | 3.5 | 1.71300 | 54.0 |
| 17 | −12.1 | | | |

$f = 11.5 - 35$ mm $f/1.8$

* * * * *